United States Patent
Schmidt et al.

(10) Patent No.: US 7,253,374 B2
(45) Date of Patent: Aug. 7, 2007

(54) SHEET-TO-TUBE WELDED STRUCTURE AND METHOD

(75) Inventors: Kenneth R. Schmidt, Macomb, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/662,841

(22) Filed: Sep. 15, 2003

(65) Prior Publication Data

US 2005/0056618 A1   Mar. 17, 2005

(51) Int. Cl.
 *B23K 11/10* (2006.01)
 *B62D 25/06* (2006.01)
(52) U.S. Cl. .................... 219/117.1; 219/86.1; 219/87; 219/59.1; 296/210
(58) Field of Classification Search ............... 219/61, 219/60 R, 117.1, 86.1, 87, 59.1; 296/210
 See application file for complete search history.

(56) References Cited

U.S. PATENT DOCUMENTS

| | | | | |
|---|---|---|---|---|
| 2,205,797 A | * | 6/1940 | Ledwinka | 296/213 |
| 2,731,245 A | * | 1/1956 | McChesney | 165/180 |
| 3,145,456 A | * | 8/1964 | Johnson | 29/890.038 |
| 3,202,793 A | * | 8/1965 | Bertels | 219/118 |
| 3,362,058 A | * | 1/1968 | Morris et al. | 29/890.048 |
| 4,168,795 A | * | 9/1979 | Bennett | 228/175 |
| 4,347,810 A | * | 9/1982 | Rees | 122/6 A |
| 5,171,959 A | | 12/1992 | Schmitt et al. | 219/98 |
| 5,423,564 A | * | 6/1995 | Harvey | 280/281.1 |
| 6,322,135 B1 | * | 11/2001 | Okana et al. | 296/203.03 |
| 6,373,021 B1 | * | 4/2002 | Wang et al. | 219/93 |
| 6,765,170 B2 | * | 7/2004 | Chen et al. | 219/59.1 |
| 6,773,048 B1 | * | 8/2004 | Freeman | 296/63 |

FOREIGN PATENT DOCUMENTS

| | | | | |
|---|---|---|---|---|
| JP | 5716837 A | * | 10/1982 | |
| JP | 5814866 A | * | 9/1983 | |
| JP | 61016174 A | * | 1/1986 | |

* cited by examiner

*Primary Examiner*—Kevin P. Kerns

(57) ABSTRACT

Method of welding a metal sheet and metal tubing as well as a welded sheet-to-tube welded structure wherein the tube-to-sheet gage ratio may be reduced to permit use of metal tubing having a reduced wall thickness. One or more intermediate metal bridging members is/are first welded to a metal tube using a relatively rapid welding process that reduces heat input and residual tensile stress imparted to the tube. A metallic sheet then is spot welded directly to the one or more bridging members, rather than to the metallic tube, to form a welded sheet-to-tube structure.

9 Claims, 3 Drawing Sheets

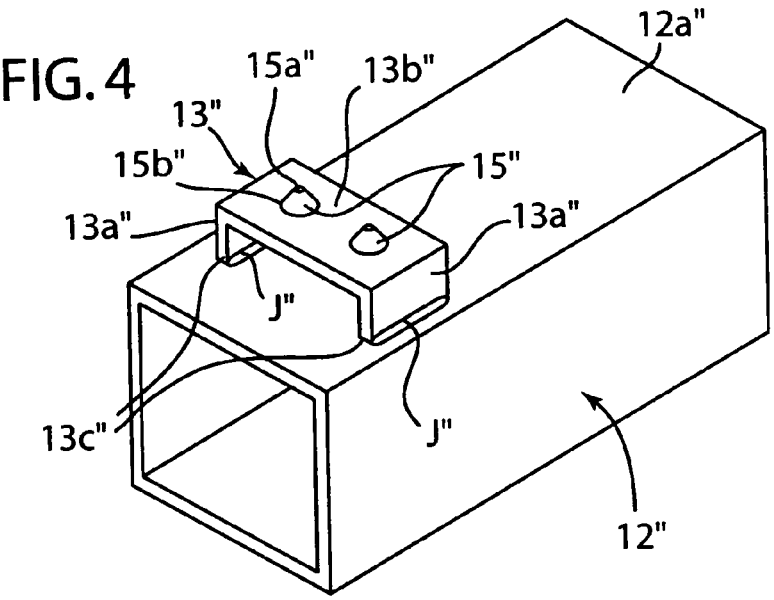
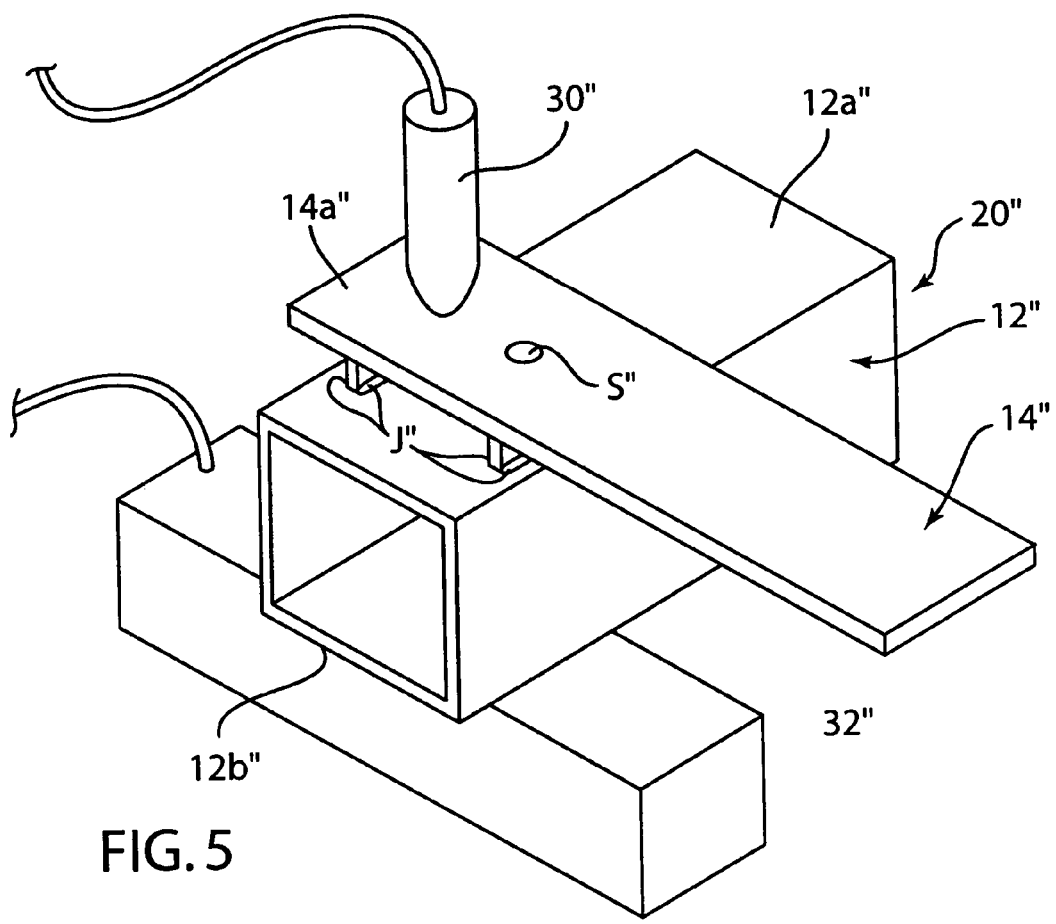

SHEET-TO-TUBE WELDED STRUCTURE AND METHOD

TECHNICAL FIELD

The present invention relates to a method of welding a metal sheet and metal tubing to fabricate a structure, such as a vehicle structure, as well as to a welded sheet-to-tube structure.

BACKGROUND OF THE INVENTION

A technique for fabricating metal automotive vehicle structures involves fusion welding one or more metal sheets to one or more hydroformed metal tubes. An electrical resistance welding process known as single-sided spot welding has been used to join a metal sheet to a metal tube as described in General Motors U.S. Pat. No. 6,373,021. In the spot welding process, a side of the metal (e.g. steel) sheet is spot welded directly to a side of the metal (e.g. steel) tube using conventional spot welding electrodes that pass electrical current through the sheet and tube to form a spot weld connecting the sheet and tube.

In certain instances, the clamping force of the spot welding electrodes in conjunction with the heat of welding have been observed to locally distort the metal tube in practice of the single-sided spot welding process. Moreover, the spot weld produced by single-sided spot welding can have severe enough residual tensile stresses localized at the welding electrode-to-sheet contact edge that cracks can develop around the spot weld and also in the metal tube and sheet metal. To avoid or reduce the extent of spot weld cracking in the fabrication of a metal structure, the ratio of the tube wall thickness to the sheet thickness (referred to as the tube-to-sheet gage ratio) has been controlled within a certain range to reduce localized tensile stresses associated with the welding operation and development of cracks around the spot weld.

SUMMARY OF THE INVENTION

The present invention provides a method of welding a metal sheet and metal tubing as well as a welded sheet-to-tube structure. In an illustrative embodiment of the invention, one or more intermediate metal bridging members is/are first welded to a metal tube, preferably using a relatively rapid welding process that reduces heat input and residual tensile stress imparted to the tube. A metal sheet then is welded to the one or more bridging members, rather than to the metallic tube, to form a welded sheet-to-tube structure. Practice of the invention permits use of a metal tube having a reduced wall thickness in the fabrication of a sheet-to-tube structure, while also reducing or eliminating harmful cracking around the spot weld at the welding electrode-to-sheet contact edge.

Advantages, features, and embodiments of the present invention will become apparent from the following description.

BRIEF DESCRIPTION OF THE DRAWINGS

FIG. 4 is a schematic perspective view illustrating practice of still another illustrative embodiment of the invention wherein a bridging bracket having protrusions is initially welded to a metal tube.

FIG. 5 is a perspective view showing the metal tube, the bridging bracket, and the metal sheet of FIG. 4 and resistance spot welding electrodes for spot welding the metal sheet to the bridging bracket to form a welded sheet-to-tube structure.

DESCRIPTION OF THE PREFERRED EMBODIMENT

The present invention provides a method for welding of a metal sheet and metal tubing in such a manner that the ratio of the tube wall thickness to the sheet thickness (referred to as the tube-to-sheet gage ratio) may be reduced while also reducing or eliminating harmful cracking around the spot weld at the welding electrode-to-sheet contact edge. The metal tube and the metal sheet can comprise any suitable fusion weldable metal or alloy including, but not limited to, low carbon steel, high strength low alloy steel, coated steel (e.g. zinc coated steel such as galvanized or galvannealed steel), aluminum coated steel, and the like), aluminum, aluminum alloy, and combinations thereof. The metal tube can have any cross-sectional configuration such as including, but not limited to, a circular, oval, polygonal (e.g. square, rectangular, triangular, etc.) cross-section. The metal tube 12 typically is a hydroformed metal tube, although metal tubes made in other ways (e.g. extruded tubes, welded tubes, etc.) can be used in practice of the invention. The metal sheet can be a flat sheet or a sheet that has been preformed to some other configuration such as including, but not limited to, a configuration of an automotive or other vehicle roof panel or body panel.

Figure 1:
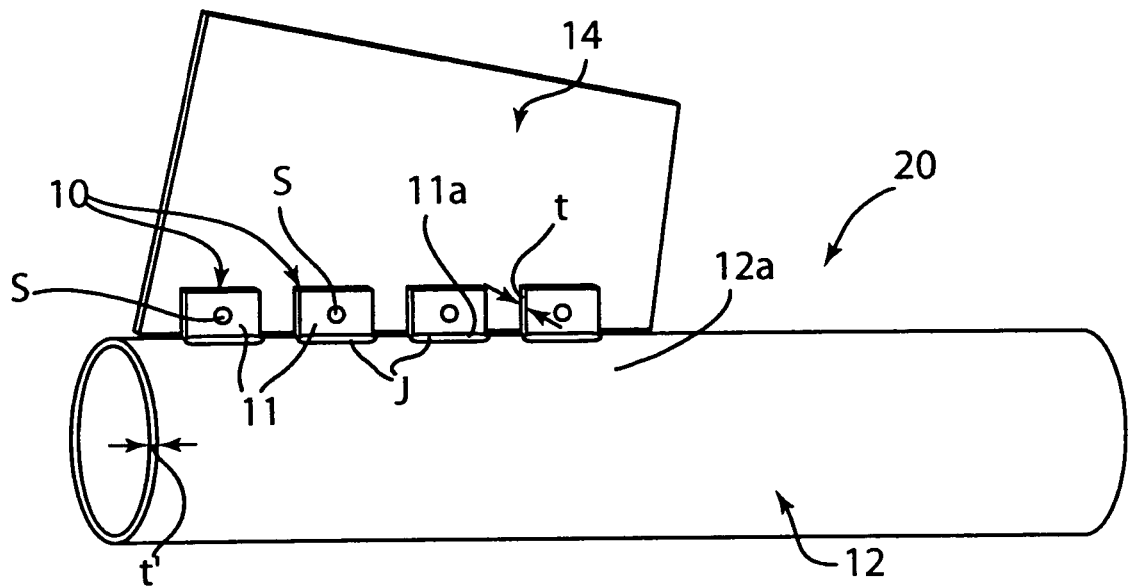
FIG. 1 is a schematic perspective view illustrating practice of an illustrative embodiment of the invention wherein multiple bridging patches are initially welded to a metal tube followed by spot welding of a metal sheet to the bridging patches.

Referring to FIG. 1, an illustrative embodiment of the invention is shown and involves first welding one or more intermediate metal bridging members 10 to an exterior surface 12a of a hollow metal tube 12. The bridging members 10 are shown as metal patches 11 having a polygonal shape (e.g. a rectangular shape) and having an edge 11a welded to the surface 12a of the metal tube 12 at respective weld joints J. The patches 11 can be welded to the tube surface 12a using any suitable arc or other welding process. Preferably, the patches 11 are arc welded to the tube surface 12a using a relatively rapid welding process that reduces heat input and residual tensile stress imparted to the tube 12. For example, a fusion welding process known as the drawn arc stud welding process is used to weld each patch 11 to the tube surface 12a. In such drawn arc welding process, a welding arc is struck between the edge 11a of the each patch 11 and the tube surface 12a during advancement of the patch 11 toward the tube surface 12a. A drawn arc stud welding process is described in U.S. Pat. No. 5,171,959, the teachings of which are incorporated herein by reference. In welding the patch 11 to the tube surface 12a, the patch 11 is substituted for the metal stud usually employed in practice of the drawn arc stud welding process. A suitable drawn arc welding machine which can be employed to weld patches 11 to the tube surface 12a comprises a model TMP 1500 stud welding machine available from Emhart Inc., Newark, Del.

The patches 11 can be made of the same or different metal or alloy as the metal tube 12. Typically, in fabrication of a welded steel sheet-to-tube structure, the metal tube 12 and the metal patches 11 will comprise the same or different steel, although the invention is not limited in this regard. The patches 11 conveniently can comprise stamped steel sheet or plate patches. The patches 11 can have the same or different thickness t as the wall thickness t' of the tube 12. For purposes of illustration and not limitation, steel patches 11 can have a thickness in the range of 0.7 mm to 4 mm for a steel tube 12 having a wall thickness in the range of 0.7 mm to 4 mm and steel sheet 14 having a thickness of 0.5 mm to 4 mm.

After the patches 11 are welded to the tube 12 as shown in FIG. 1, the metal sheet 14 is spot welded directly to the patches 11, rather than to the metal tube 12, to form a welded sheet-to-tube structure 20. The welded sheet-to-tube structure 20 comprises the metal sheet 14 spot welded at spot welds S to the patches 11, which in turn are welded to the surface 12a of the metal tube 12 by weld joints J.

Figure 2:
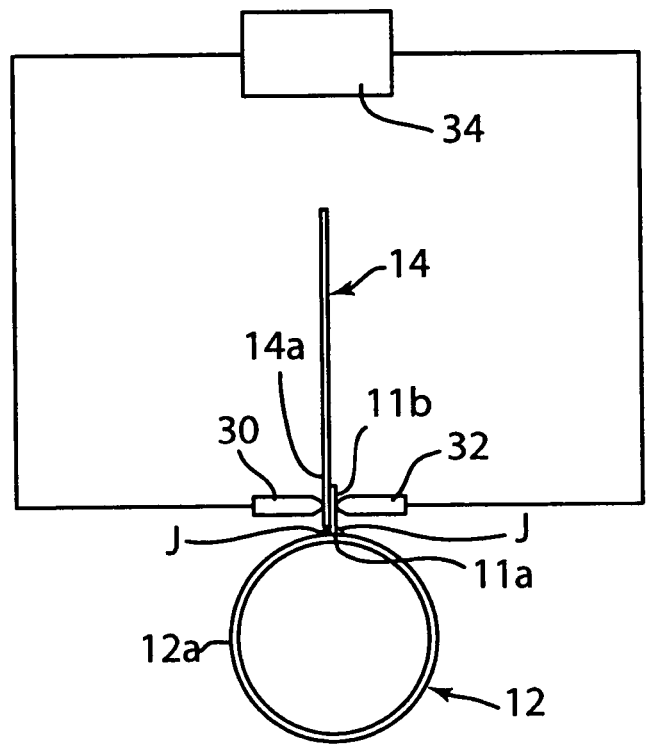
FIG. 2 is an end elevation of FIG. 1 showing resistance spot welding electrodes for spot welding the metal sheet to the bridging patches to form a welded sheet-to-tube structure pursuant to an embodiment of the invention.

Referring to FIG. 2, the metal sheet 14 is spot welded to the patches 11 using conventional spot welding electrodes 30, 32 located adjacent the major side 14a of the metal sheet 14 and the major side 11b of each patch 11 and clamped against respective sides 14a, 11b. The electrodes 30, 32 are connected to a source 34 of electrical power in a manner to pass electrical current through the sheet 14 and the patch 11 to melt the sheet 14 and patch 11 in the vicinity of the electrodes 30, 32 and, upon cooling, form a spot weld nugget S therebetween that connects the sheet 14 and the respective patch 11. The electrodes 30, 32 can comprise ball-nose (b-nose) copper electrodes with a ball nose radius of 3.8-4 mm for purposes of illustration and not limitation. The metal sheet 14 can be welded to the individual patches 11 one at a time or preferably in a single welding operation where the metal sheet 14 is spot welded to all of the patches 11 at the same time. A suitable spot machine which can be employed to weld the sheet 14 to patches 11 comprises a model 1FG/C frame welder spot welding machine available from Banner Welder Inc., Germantown, Wis.

Fabrication of the welded sheet-to-tube structure 20 in the manner described above permits the aforementioned tube-to-sheet gage ratio to be reduced to permit use of metal tube 12 having a reduced wall thickness t'. For example, the metal tube 12 may have a wall thickness t' as thin as about 0.7 mm (millimeter) up to about 4 mm as compared to the heretofore used range for tube wall thickness of about 1.75 mm to about 2.0 mm for the same thickness of the metal sheet 14. Use of a thinner-walled tube 12 as permitted by practice of the invention results in a reduction in the weight of the welded structure 20 as well as reduced cost for the tubing itself. Moreover, fabrication of the welded sheet-to-tube structure 20 in the manner described reduces or eliminates harmful cracking around the spot welds S at the welding electrode-to-sheet contact edge.

Figure 3:
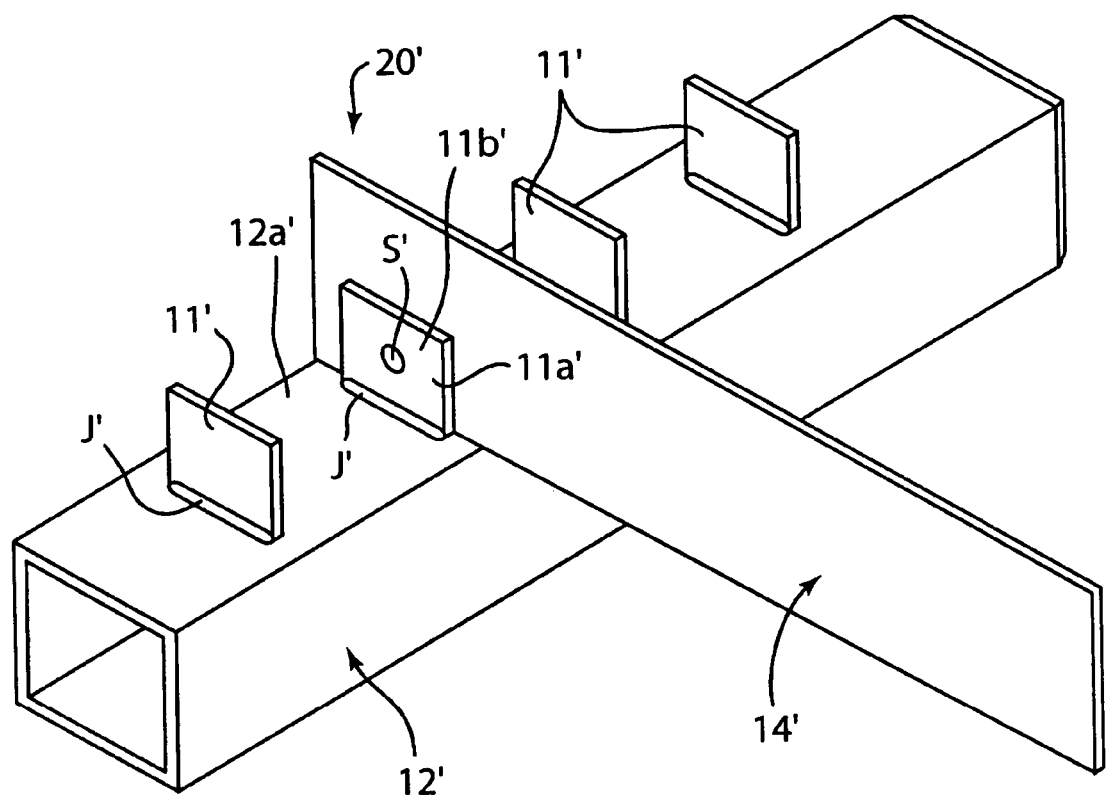
FIG. 3 is a schematic perspective view illustrating practice of another illustrative embodiment of the invention wherein multiple bridging patches are initially welded to a metal tube perpendicular to its length followed by spot welding of a metal sheet to a bridging patch to form a welded sheet-to-tube structure.

Referring to FIG. 3, another illustrative embodiment of the invention is shown for purposes of illustration and not limitation. In FIG. 3, like features of FIGS. 1-2 are illustrated by reference numerals primed. FIG. 3 shows multiple bridging patches 11' having respective edges 11a' that are initially drawn arc or otherwise welded as described above at weld joints J' to an exterior surface 12a' of the metal tube 12' having a polygonal (e.g. square) cross-section. The patches 11' are welded onto the exterior surface 12a' of the tube 12' perpendicular to its length, rather than parallel to its length as shown in FIGS. 1-2. A metal sheet 14' is shown spot welded at spot weld S' as described above to the side 11b' of one of the patches 11'. The welded sheet-to-tube structure 20' of FIG. 3 can comprise a wheelhouse-to-tube cross-beam structure.

Referring to FIGS. 4-5, like features of FIGS. 1-2 are illustrated using like reference numerals double primed. The embodiment of FIGS. 4-5 includes a metal bridging bracket member 13" that is initially welded to the side 12a" of the hollow metal tube 12". The bridging bracket member 13" comprises a pair of legs 13a" connected together by integral web section 13b". The ends of the legs 13a" are welded at weld joints J" on the side 12a" of the metal tube 12" using the drawn arc welding process described above wherein a welding arc is struck between the ends of the legs 13a" and the tube surface 12a" during movement of the bracket 13" toward the tube side 12a", or using any other suitable welding process.

The bracket member 13" optionally includes a pair of integral frusto-conical protrusions 15" disposed on the web section 13b". The cross-sectional dimension of each protrusion 15" decreases from an apex 15a" toward a base 15b" thereof. The bracket member 13" having the features described can be formed by stamping a metal sheet (e.g. steel sheet) for convenience, although the invention is not limited in this regard.

After the bridging bracket member 13" is welded on the tube surface 12a", the metal sheet 14" is welded on the bracket member 13", rather than directly to the side 12a" of the metal tube 12". The metal sheet 14" preferably is spot welded to the bracket member 13" using a single-sided electrical resistance spot welding process to form and complete the welded sheet-to-tube structure 20", FIG. 5. The welded sheet-to-tube structure 20" comprises the metal sheet 14" spot welded at spot welds S" to the bracket member 13", which in turn is welded to the surface 12a" of the metal tube 12" by weld joints J".

Referring to FIG. 5, the sheet 14" is single-sided spot welded to the bracket member 13" using a spot welding electrode 30" located adjacent the side 14a" of the metal sheet 14" and a back-up electrode 32" located adjacent a side 12b" of the metal tube 12". The electrode 30" is aligned initially above one of the protrusions 15". The electrodes 30", 32" are clamped under pressure against respective sides 14a", 12b". Electrical current is passed through the sheet 14", bracket member 13", and metal tube 12" to melt the protrusion 15". Upon cooling, a solidified spot weld nugget is formed and connects the sheet 14" to the bracket member 13". The process is repeated for the other protrusion 15" to form a spot weld there also. The spot welds S" can be formed simultaneously at the protrusions 15" by using multiple electrodes 30" equal to the number of protrusions.

The following EXAMPLE is offered to further illustrate but not limit the invention.

EXAMPLE

A plurality of low carbon steel patches 11 having dimensions of 10 mm width, 10 mm height, and 1 mm thickness were drawn arc fusion welded to an exterior surface of a low carbon steel square tube having outer dimensions of 50 mm×50 mm and wall thickness of 1 mm in an orientation as shown in FIG. 1. Each patch 11 was welded to the exterior surface of the steel tube using a model TMP 1500 stud welding machine available from Emhart Inc., Newark, Del.

using standard weld settings. After the patches were arc welded on the tube, a low carbon steel sheet of 1 mm thickness was spot welded to each patch using ball-nose copper electrodes (nose radius of 4 mm) and a model 1FG/C frame welder spot welding machine available from Banner Welder Inc., Germantown, Wis. using standard weld settings. A welded sheet-to-tube structure was thereby fabricated with the spot welds of the patches 11 being free of cracking.

It should be understood that the invention is not limited to the specific embodiments or constructions described above but that various changes may be made therein without departing from the spirit and scope of the invention as set forth in the appended claims.

The invention claimed is:

1. Method of welding a metal sheet and a metal tube, comprising welding an edge of respective multiple metal bridging patches to a metal tube, and spot welding a metal sheet to the multiple bridging patches.

2. Method of welding a metal sheet and a metal tube, comprising welding a pair of legs of a metal bridging bracket member to the metal tube and spot welding the metal sheet to a web section of the bracket member connecting its legs.

3. The method of claim 2 wherein the bracket member includes one or more protrusions on the web section before the metal sheet is welded, and the metal sheet is spot welded to the web section at each of the protrusions.

4. The method of claim 2 wherein ends of the legs of the bracket member are drawn arc welded to the metal tube.

5. A welded sheet-to-tube structure, comprising a metal sheet spot welded to multiple metal bridging patches each having an edge welded to an exterior surface of a metal tube.

6. A welded sheet-to-tube structure, comprising a metal tube, a metal bracket member having a pair of legs whose ends are welded to the metal tube and a web section connecting the legs, and a metal sheet spot welded to the web section of the bracket member.

7. The structure of claim 6 wherein the metal sheet comprises a roof panel of a vehicle.

8. A welded sheet-to-tube structure, comprising a metal sheet having a major side spot welded to multiple metal bridging patches that are welded to an exterior surface of a metal tube.

9. A welded sheet-to-tube structure, comprising a metal sheet spot welded to multiple metal bridging patches that are welded to an exterior surface of a metal tube wherein the metal sheet comprises a roof panel of a vehicle.

* * * * *